United States Patent [19]
Lang et al.

[11] 3,968,733
[45] July 13, 1976

[54] HYDRAULIC POWER-STEERING SYSTEM FOR AUTOMOTIVE VEHICLES

[75] Inventors: Armin Lang, Schwabisch-Gmund-Bettringen; Falk Kurz, Schorndorf; Wolfgang Walter, Schwabisch-Gmund, all of Germany

[73] Assignee: Zahnradfabrik Friedrichshafen AG, Friedrichshafen, Germany

[22] Filed: May 15, 1974

[21] Appl. No.: 470,046

[52] U.S. Cl. .................................. 91/451; 91/466
[51] Int. Cl.² .................. F15B 11/08; F15B 13/042
[58] Field of Search ..................... 91/451, 452, 466

[56] References Cited
UNITED STATES PATENTS

| | | | |
|---|---|---|---|
| 2,986,126 | 5/1961 | Werts | 91/452 |
| 3,411,416 | 11/1968 | Herd et al. | 92/452 |
| 3,564,975 | 2/1971 | Moran | 91/451 |

Primary Examiner—Paul E. Maslousky
Attorney, Agent, or Firm—Karl F. Ross; Herbert Dubno

[57] ABSTRACT

A steering shaft, linked with the dirigible wheels of an automotive vehicle and coupled with a hydraulic servomotor for rotation in either direction under the control of a main valve, has two abutments for alternately opening two normally closed ancillary valves in respective limiting positions of the shaft, these ancillary valves being inserted in branches of two feeder lines extending from the main valve to respective cylinder chambers of the servomotor. Either ancillary valve, when opened, connects one cylinder compartment of a differential valve to the feeder line then under low pressure, the other compartment of that differential valve being connected to a supply conduit whereby a pressure difference is created across a spring-loaded piston in that valve whose two compartments are interconnected by a bleeder line. The piston, upon being displaced by this pressure against its spring force, vents the supply conduit to the low-pressure side of the fluid source to arrest the servomotor.

9 Claims, 1 Drawing Figure

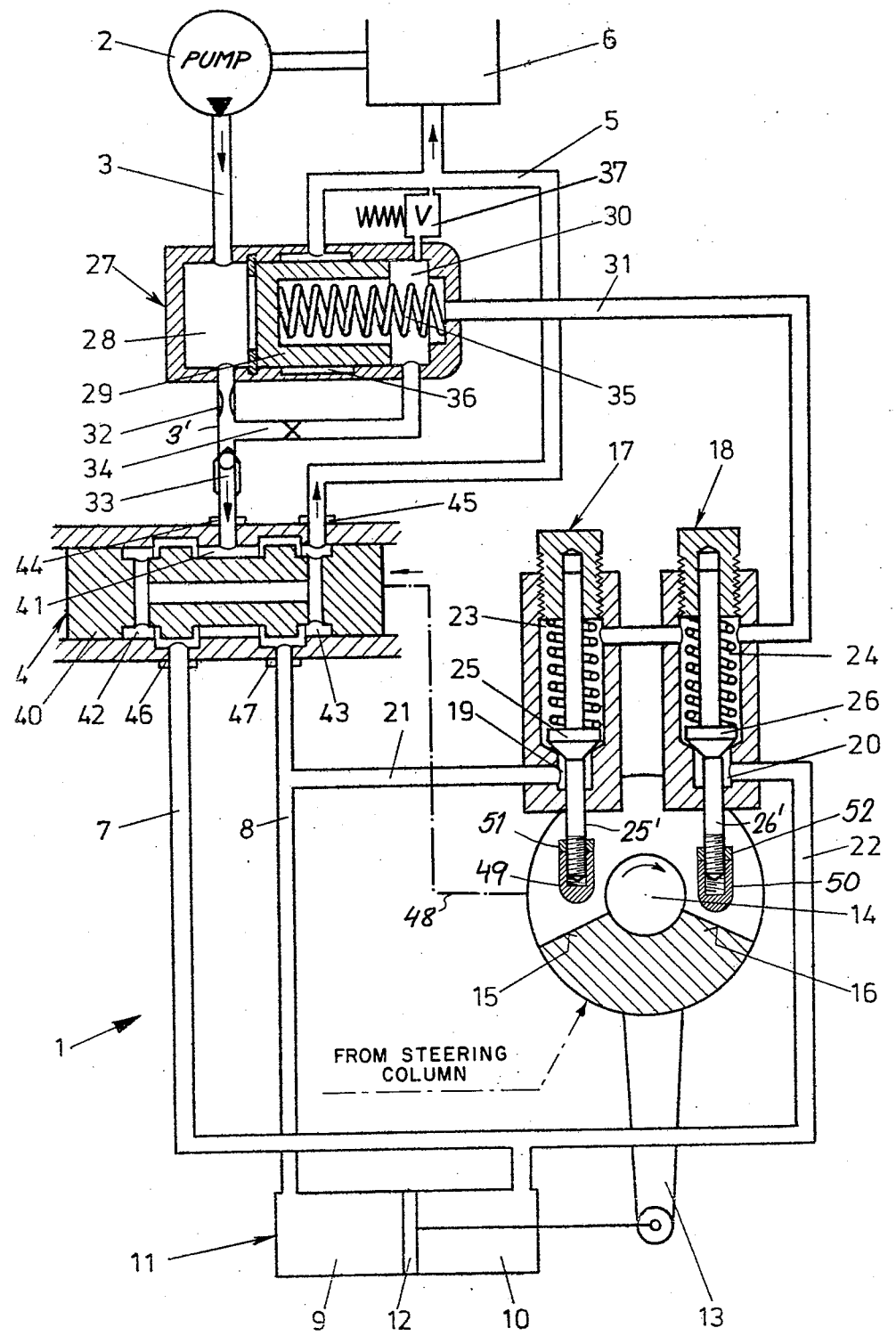

HYDRAULIC POWER-STEERING SYSTEM FOR AUTOMOTIVE VEHICLES

FIELD OF THE INVENTION

Our present invention relates to a hydraulic power-steering system, of the type used in automotive vehicles, wherein the manual rotation of a steering shaft is assisted by fluid pressure acting upon a servomotor linked with that shaft.

BACKGROUND OF THE INVENTION

The admission of hydraulic fluid to a servomotor of such a system is controlled, as is well known per se, by the incipient manual rotation of the steering shaft in one or the other direction, this incipient rotation causing the shifting of a main valve from an inoperative position into either of two working positions to pressurize the servomotor in the corresponding sense. It is generally desirable that the intervention of the servomotor be limited to the central part of the range of rotation of the steering shaft, the servomotor becoming inoperative as soon as the shaft approaches either limit of its range. Thus, it is known to provide at least one ancillary valve which, as soon as the shaft reaches either of two cut-out positions, short-circuits the servomotor by opening a bypass between its two feeder lines. The hydraulic fluid traversing the main valve then flows through the ancillary valve in series therewith, making it necessary for such valve to carry the entire circulation delivered by the supply pump.

For a smooth transition from power-assisted to purely manual steering, in the terminal phase of shaft rotation, the effective cross-section of the bypass valve or valves should be suitably dimensioned to depressurize the servomotor in a gradual manner, i.e., over a certain time interval. That interval, however, varies with the supply pressure and also with the viscosity of the hydraulic fluid (e.g. oil), being therefore dependent on temperature. If the bypass is too wide, the transition becomes rather abrupt; if it is too narrow, its flow resistance may be so large that the servomotor remains operative. Moreover, the presence of this bypass practically eliminates the ability of the servomotor to absorb the road shocks to which the dirigible wheels of the vehicle are subjected in their veering positions.

OBJECTS OF THE INVENTION

The general object of our present invention, therefore, is to provide an improved system of the character described which avoids the aforestated drawbacks.

A more particular object is to provide means in such a system for allowing the servomotor to act as a hydraulic shock absorber in the above-mentioned sense even after the steering shaft has been rotated beyond one of its cut-off positions.

SUMMARY OF THE INVENTION

We realize these objects, in accordance with the present invention, by the provision of a differential valve including a cylinder whose interior is divided by a spring-loaded piston into a first and a second compartment, the first compartment being connected to the high-pressure side of the fluid source which is normally disconnected from an outlet leading to the low-pressure side of that source. The feeder lines of the servomotor have respective branch lines which form part of a set of conduits extending to the second compartment of the differential valve, each of these branch lines being normally closed by a respective ancillary valve which is opened by actuating means coupled with the steering shaft upon the latter approaching a terminal position while rotating in a given direction with the assistance of the servomotor. The ancillary valve thus opened lies in the branch of that feeder line which happens to be depressurized at the moment; thus, the second compartment of the differential valve is now connected to low pressure whereby a pressure difference is built up across its piston, causing same to move against its spring force into an off-normal position to vent the high-pressure side of the circuit to the outlet of its cylinder. This bypasses not only the servomotor, as in the conventional system, but also the main valve giving access to its feeder lines; the transition time from servo-assisted to exclusively manual steering is determined by the spring force within the differential valve and can be freely selected without regard to supply pressure or oil temperature inasmuch as the major part of the circuit with its flow resistance lies downstream of the bypass thus created.

According to another feature of our invention, the two compartments of the differential valve are interconnected by a bleeder line branching off a supply line which connects the first compartment of that differential valve with an inlet port of the main valve, the junction of this supply line with the bleeder line advantageously lying downstream of a throttle and upstream of a check valve which keeps an oil cushion in the previously pressurized chamber of the servomotor for the absorption of road shocks.

According to another feature of our invention, the ancillary valves in the aforementioned branch lines have cylinder chambers occupied by spring-loaded plungers with projecting stems engageable by respective abutments on the steering shaft, these cylinder chambers forming part of the connecion between the branch lines and the second compartment of the differential valve. That second compartment may be connected to the low-pressure side of the hydraulic system through a normally closed pressure-relief valve.

BRIEF DESCRIPTION OF THE DRAWING

The above and other features of our invention will now be described in detail with reference to the accompanying drawing the sole FIGURE of which diagrammatically illustrates a power-steering system according to the present invention.

SPECIFIC DESCRIPTION

The steering system 1 shown in the drawing comprises a pump 2 whose high-pressure port is connected via a supply line 3 to a main valve 4 by way of a first compartment 28 of a differential valve 27 also having a second compartment 30 separated from compartment 28 by a piston 29. A spring 35 within compartment 30 tends to maintain the piston 29 in its illustrated normal position in which it blocks an outlet 36, in the form of a peripheral groove on the inner cylinder wall of the valve, that communicates with a drain 5 leading to a sump 6 on the low-pressure side of pump 2, the pump 2 and the sump 6 together constituting a source of hydraulic fluid. An extension 3' of supply conduit 3, lying between valves 27 and 4, communicates with the right-hand valve compartment 30 via a constricted bleeder line 34; a throttle 32 in line 3', upstream of its junction with line 34, ensures the maintenance of a certain fluid pressure within compartment 28, this pressure exceeding the force of spring 35 but being insufficient to overcome this spring force supplemented by the fluid pressure admitted via bleeder line 34. A check valve 33 in line 3', downstream of its junction with line 34, prevents a return flow to either compartment of valve 27. Compartment 30 can be vented to drain 5 via a spring-loaded pressure-relief valve 37.

Line 3' terminates at an inlet port 44 of valve 4 which also has an outlet port 45 connected to drain 5. Two further ports 46 and 47, opening into respective feeder lines 7 and 8, are normally in limited communication with three peripheral grooves 41, 42 and 42 of a shiftable valve body 40, groove 41 being open toward inlet port 44 whereas the internally interconnected grooves 42 and 43 are connected to outlet 45. In the illustrated central position of valve body 40, a limited and balanced pressure prevails in the two lines 7 and 8 which extend to respective chambers 10 and 9 in the cylinder of a servomotor 11 on opposite sides of a piston 12. A linkage 13 couples this piston with a steering or pitman shaft 14 which is manually rotatable in the conventional manner (e.g. through a worm and a sector gear) by means of a nonillustrated steering wheel and column, as shown for example in U.S. Pat. No. 3,564,975, the shaft 14 being also connected to the dirigible wheels (not shown) of an automotive vehicle of which the system 1 forms part. The power train including the shaft 14 is operatively connected, in a well-known manner and as schematically represented at 48, with the valve 4 whose slidable body 40 is shifted in one direction or the other upon incipient manual rotation of shaft 14 in a corresponding sense. Thus, clockwise rotation of shaft 14 results in a leftward shift of valve body 40, as indicated by the arrows, whereby line 7 is pressurized along with servomotor chamber 10 whereas line 8 is depressurized along with servomotor chamber 9, causing the piston 12 to move to the left and to accelerate the clockwise rotation of shaft 14. Upon a counterclockwise manual rotation of that shaft, line 8 is pressurized and line 7 is depressurized with displacement of piston 12 to the right.

Feeder lines 8 and 7 are provided with respective branch lines 21 and 22 extending to respective ports 19 and 20 of a pair of ancillary valves 17 and 18 having cylinder chambers 23 and 24 which communicate via a conduit 31 with compartment 30 of differential valve 27. Chambers 23 and 24 are normally disconnected from ports 19 and 20, and therefore from branch lines 21 and 22, by spring-loaded plungers 25 and 26 having stems 25' and 26' projecting into the path of a pair of abutments 15 and 16 on a shoulder integral with shaft 14. The angular shaft positions in which these stems are engaged by the respective abutments may be made independently adjustable by suitable means here schematically represented by a pair of cap nuts 49, 50 and counternuts 51, 52 threaded onto the extremities of these stems.

Upon clockwise rotation of shaft 14 toward its limiting position, abutment 15 engages the stem 25' through its nut 49 and lifts the plunger 25 off its seat, thereby opening the ancillary valve 17 and establishing a connection between the depressurized feeder line 8 and the right-hand compartment 30 of differential valve 27. The venting of this compartment causes the piston 29 to shift to the right, thereby unblocking the outlet groove 36 and creating a bypass between supply line 3 and drain 5. This action prevents further pressure increases in line 7 so that servomotor 11 is deactivated, yet the driver may manually rotate the shaft 14 beyond this cut-off position against the spring force of plunger 25. The column of oil remaining in line 7 and chamber 10, however, is trapped by the check valve 33 so as to provide a hydraulic cushion against road shocks acting upon the dirigible vehicle wheels in a sense tending to displace the piston further to the right; the spring-loaded plunger 26 of the other ancillary valve 18 acts as an escape valve in the event of a severe impact. Road shocks effective in the opposite sense are, of course, absorbed by the spring-loaded plunger 25.

If the steering shaft 14 is rotated counterclockwise into its alternate cut-off position, the roles of valves 17 and 18 are reversed; with line 7 depressurized under these conditions, the operation is analogous to that described above.

It will be noted that only a small amount of oil traverses the controlling valves 17 and 18 at the instant of cut-off and that thereafter even this flow is practically stopped with the venting of supply line 3 upstream of throttle 32 and the concurrent blocking of the bleeder line 34 by piston 29. These valves 17 and 18 can therefore be designed with a small capacity and operate substantially independently of pump pressure, viscosity and temperature, enabling a very precise selection of the cut-off positions.

We claim:
1. A vehicular steering system comprising:
 a source of hydraulic fluid having a high-pressure side and a low-pressure side;
 a hydraulic servomotor with a movable element and with two feeder lines for alternately driving said movable element in opposite directions;
 main valve means inserted between said source and said feeder lines for reversibly connecting same to said high-pressure side and said low-pressure side, respectively, said main valve means normally maintaining said feeder lines at a balanced pressure;
 a steering shaft linked with said movable element for bidirectional rotation thereby, said shaft being manually rotatable and being operatively coupled with said main valve means for shifting same, upon incipient manual rotation in a given direction, into a working position pressurizing one of said feeder lines and depressurizing the other of said feeder lines to displace said movable element in a sense aiding the rotation of said shaft in said given direction;
 differential valve means including a cylinder and a spring-loaded piston dividing the interior of said cylinder into a first and a second compartment, said first compartment being connected to said high-pressure side, said cylinder having an outlet leading to said low-pressure side, said piston being urged by its spring force into a normal position blocking said outlet;
 conduit means extending from said feeder lines to said second compartment, said conduit means including a pair of branch lines respectively connected to said feeder lines;
 a pair of normally closed ancillary valves in said branch lines; and
 actuating means mechanically coupled with said shaft for opening, upon said shaft approaching a terminal position while performing a hydraulically assisted rotation in said given direction, a respective ancillary valve in the branch line of the depres- surized feeder line with resulting development of a pressure difference across said piston for moving the latter against its spring force into an off-normal position venting said high-pressure side to said outlet, thereby depressurizing the previously pressurized feeder line.

2. A steering system as defined in claim 1 wherein said cylinder is provided with a bleeder line interconnecting said compartments.

3. A steering system as defined in claim 2 wherein said high-pressure side is connected to said main valve means through a supply line extending from said first compartment, said bleeder line being branched off said supply line.

4. A steering system as defined in claim 3, further comprising throttle means disposed in said supply line upstream of its junction with said bleeder line.

5. A steering system as defined in claim 3, further comprising a check valve disposed in said supply line downstream of its junction with said bleeder line.

6. A steering system as defined in claim 1 wherein said ancillary valves comprise a pair of cylinder chambers and a pair of spring-loaded plungers in said cylinder chambers, said plungers normally disconnecting said branch lines from said cylinder chambers, said conduit means including a connection from said second compartment to both said cylinder chambers.

7. A steering system as defined in claim 6 wherein said plungers have stems projecting from said cylinder chambers, said actuating means comprising a pair of abutments on said shaft positioned to coact with said stems, respectively.

8. A steering system as defined in claim 7 wherein said ancillary valves are provided with separate adjustment means for independently varying the positions of engagement of said abutments with said stems.

9. A steering system as defined in claim 1 wherein said differential valve means is provided with a normally closed connection, including a pressure-relief valve, extending to said low-pressure side.

* * * * *